United States Patent Office 3,637,590
Patented Jan. 25, 1972

3,637,590
THERMOPLASTIC POLYETHER RESINS OF BISPHENOLS
Russel L. Maycock, 7206 Prestwick St., Houston, Tex. 77025, and Alton J. Landua, 280 Wyoming Ave., Maplewood, N.J. 07040
No Drawing. Continuation-in-part of application Ser. No. 598,527, Aug. 8, 1966, which is a division of application Ser. No. 145,486, Oct. 16, 1961, now Patent No. 3,306,872, which in turn is a continuation-in-part of application Ser. No. 46,387, Aug. 1, 1960. This application Mar. 31, 1970, Ser. No. 24,357
Int. Cl. C08g 30/04
U.S. Cl. 260—47 EP     8 Claims

ABSTRACT OF THE DISCLOSURE

Novel thermoplastic polyethers having high impact resistance consist essentially of linear molecules having a repeating structure

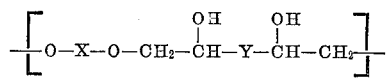

wherein X is the central or residue group, between the —OH groups, of a dihydric polynuclear phenol and Y the central or residue group, between the oxirane rings, of a terminal di-vic-epoxide. Preferred are those polyethers in which X and Y are the residue groups, respectively, of bisphenols and of diglycidyl ethers or lower polyethers of bisphenols, especially preferred bisphenols being bisphenol A and 4,4'-dihydroxydiphenylmethylphenylmethane.

---

This application is a continuation-in-part of our copending application Ser. No. 598,527, filed Aug. 8, 1966, now abandoned, which is a division of our application Ser. No. 145,486, filed Oct. 16, 1961, now U.S. Pat. 3,306,872, which is a continuation-in-part of our application Ser. No. 46,387, filed Aug. 1, 1960, now abandoned.

This invention relates to linear thermoplastic polyethers. It relates particularly to linear thermoplastic polyethers characterized by high impact resistance.

High resistance to impact is a property which is particularly desirable in plastics used in applications in which they are exposed to mechanical shock. Typical uses are housings for radios and other electronic equipment and gears for small machines and appliances. In many instances, plastics which are otherwise satisfactory for a particular application are found to be deficient in impact resistance.

Polycarbonates have achieved commercial importance in part because they possess high impact resistance. However, the presence of the carbonate bond makes them susceptible to chemical attack by alkalis and in general weakens their chemical resistance. Another disadvantage of polycarbonates is that they are difficult to handle in injection molding equipment because they are resistant to flow even at very high temperature and pressures.

This invention provides thermoplastics which are characterized by high impact resistance when in the form of molded, extruded or otherwise formed shapes; they are similar to polycarbonates in a number of properties and superior in some respects. The polyethers of this invention have excellent resistance to numerous chemicals, flow readily at injection molding conditions, and are suitable for the above-mentioned uses.

The polyethers of this invention, without any chemical modification, are also suitable for the preparation of surface coatings which have excellent coating and adhesion properties. Coatings prepared from solutions of these polyethers have outstanding toughness, adhesion, abrasion resistance, hardness, flexibility and chemical resistance. They can be used on a great variety of base materials. Further, because of their excellent adhesion to various materials, these polyethers are suitable for use as adhesives for bonding various materials.

In the prior art, U.S. 2,506,486 to Bender et al. discloses the preparation of thermoset resins by reaction of a dihydric phenol with a diglycidyl ether of a dihydric phenol. The reaction is promoted by mild heating or use of catalysts and results in the formation of a gel and subsequently of a hard, infusible, cross-linked resin. The reactants of Bender et al. are, at least in many instances, also suitable as reactants for producing the thermoplastic polyethers of this invention by the methods claimed in U.S. Pat. 3,306,872. The products of Bender et al. are, however, completely different from the polyethers of this invention.

Fiber-forming thermoplastic resins produced by the condensation of epichlorohydrin and phenolic dihydroxy compounds are disclosed in U.S. 2,602,075 to Carpenter et al. The procedure of the patent includes heating the reactants, either as such or in the presence of a diluent, generally alcohol, and a large amount of water, in such a manner that the resin precipitates during the heating step. Although there is some resemblance between some modes of the process of Carpenter et al. and preferred methods for producing the products of the present invention, it has been found that the resins of Carpenter et al. do not have the high impact resistance possessed by polyethers of the present invention made from the same starting materials.

The thermoplastic polyethers of this invention differ fundamentally from the well-known epoxy resins. Epoxy resins are normally made and applied by reacting polyglycidyl ethers of dihydric phenols or formulations containing them with curing agents, the reaction resulting in the formation of highly cross-linked, thermoset products. By contrast, the polyethers of this invention are linear thermoplastics, characterized by the substantial absence of cross-linking or branching and requiring no curing agents for utility.

This invention comprises high molecular weight thermoplastic polyethers of high impact resistance consisting essentially of linear molecules having a structure characterized by the repeating unit

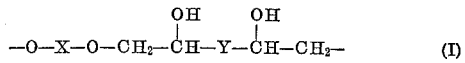     (I)

in which X is the central or residue group, between the —OH groups, of a dihydric polynuclear phenol OHXOH (II), e.g.,

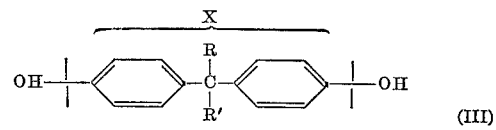     (III)

and Y is the divalent central or residue group, between the vicinal epoxy groups (oxirane rings), of a terminal di-vic-epoxide

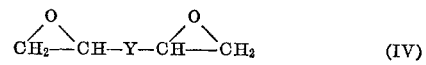     (IV)

e.g.,

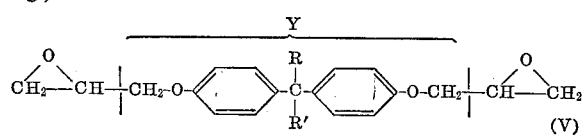     (V)

The terminating end groups of the polyethers of this invention can be phenol groups, vicinal epoxy groups or alpha glycol groups. Usually, each of these groups will be present.

Preferred polyethers of this invention consist essentially of linear molecules having repeating units of Formula I in which Y represents (a) the residue group, between vicinal epoxy groups, of a diepoxide selected from the group consisting of terminal diepoxy alkanes of from 4 to 8 carbon atoms per molecule, terminal diepoxides of saturated aliphatic ethers containing from 6 to 10 carbon atoms; or, preferably, (b) the group

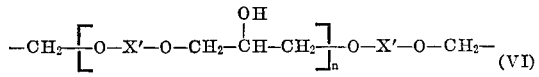

wherein the average value of $n$ is in the range from 0 to about 6 and preferably no greater than 3; X and X′ represent identical or different bisphenylene alkylene groups

and R and $R_2$, when taken collectively with the connector carbon atom C, are cyclohexyl or alkyl-substituted cyclohexyl groups, and when taken separately, are hydrogen, alkyl, cyclohexyl, phenyl, alkyl-substituted cyclohexyl, alkyl-substituted phenyl, halogen-substituted cyclohexyl or halogen-substituted phenyl groups with the total number of carbon atoms in the group or groups attached to C not exceeding eighteen and the number of carbon atoms in any of said alkyl substituent groups preferably not exceeding six.

A preferred group of polyethers of this invention consist essentially of linear molecules having repeating units of Formula I in which Y has the structure of Formula II wherein $n$ is zero, and which are therefore characterized by the repeating unit:

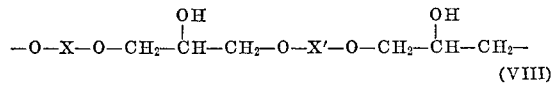

or, when X and X′ are identical, by the repeating unit

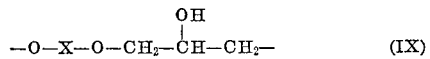

The preferred bisphenylene methylene groups VII are substituted in the 4,4′ positions, but those substituted in the 2,2′,3,3′,2,4′, and other positions may also be used. Preferred compounds are those in which both R and R′ are methyl and those in which R is methyl and R′ is phenyl.

Groups X and X′ may be the residue groups dihydric polynuclear phenols such as the 2,2′; 2,3′; 2,4′; 3,3′; 3,4′; and 4,4′ isomers preferably the latter, of dihydroxydiphenyl methane, of dihydroxydiphenyl methylmethane, of dihydroxydiphenyldimethylmethane, of dihydroxydiphenylethylmethylmethane, of dihydroxydiphenyldiethylmethane, of dihydroxydiphenylmethylpropylmethane, of higher homologs up to and including the mono- and dihexyl and mono- and dicyclohexyldiphenylolmethanes, of dihydroxydiphenylmethylphenylmethane, of dihydroxydiphenylethylphenylmethane, of dihydroxydiphenylpropylphenylmethane, of dihydroxydiphenylbutylphenylmethane, of dihydroxydiphenyltolylmethane, of dihydroxydiphenyltolylmethylmethane, and higher homologs thereof up to and including a total of twelve carbon atoms in the groups (R and R′) attached to the methane or connector carbon atom to which the two phenylol groups are attached; and of diphenylolcyclohexane, and homologs thereof. Substituent groups may also be present on the aromatic ring of one or both of the phenylene groups. The 4,4′-bisphenylene methylene isomers, for instance, can have the 2, 3, 5, 6, 2′, 3′, 5′, and 6′ positions available for substituents. The positions available for substituents in other isomers will readily be apparent in accord with well-established principles. These substituents may be the lower alkyl groups as methyl, ethyl, propyl, butyl, pentyl, and hexyl, and halogens, preferably chlorine.

The central group Y of Formula IV may be the residue group of terminal diepoxyalkanes of from 4 to 8 carbon atoms, e.g., of 1,2-epoxy-3,4-epoxybutane, 1,2-epoxy-5,6-epoxyhexane, 1,2-epoxy-7,8-epoxyoctane and the like; of terminal diepoxides containing ether linkages, such as terminal diepoxides of saturated aliphatic ethers containing from 6 to 10 carbon atoms, e.g., bis(2,3-epoxypropyl) ether and bis-(2,3-epoxy-2-methylpropyl)ether and diglycidyl ethers of alpha, omega glycols such as the diglycidyl ethers of ethylene glycol, trimethylene glycol, and tetramethylene glycol; or terminal aromatic lower polyether diepoxides described below.

In preferred polyethers of this invention, the group Y is the central residue group, between the vicinal epoxy groups, of a diglycidyl ether of a dihydric polynuclear phenol in which the phenol is one of the polynuclear phenols described above.

The products of this invention include those polyethers in which the group Y is the central residue group, between the vicinal epoxy groups, of a terminal diepoxide which is a lower polyether, typically a diglycidyl ether, resulting from the reaction of a dihydric phenol and an epihalohydrin and contains from 2 to about 6 residues of the phenol.

A product of this invention produced by reaction of a dihydric phenol with such a lower diglycidyl polyether of a dihydric phenol consists essentially of molecules having repeating units of Formula I in which Y is a group of Formula VI wherein $n$ has a positive value, and X and X′ have the Formula VII. When X and X′ are identical, these products consist essentially of linear molecules having repeating units represented by Formulas VIII and IX.

The epoxy group content of products of this invention is less than 0.01 epoxy equivalent per 100 grams of polyether and is normally well below this value in the range from 0.002 to 0.008. Typical products polyethers of this invention contain epoxy end groups in concentrations in the range from 0.002 to about 0.005 epoxy equivalent per 100 grams of polyether, e.g., 0.002, 0.0051 and 0.0053, illustrated in Examples 31 and 38. This is in contrast to the much higher epoxy content of conventional bisphenol A-based diepoxide type "epoxy resins" which are utilized by reaction with a curing agent to produce thermoset epoxy resins. The epoxy content of such resins in the commercial range is above 0.5 epoxy equivalents per 100 grams for those which are predominantly diglycidyl ethers of bisphenol A, above about 0.1 for most commercial resins of this type, and typically in the range of about 0.02–0.04 for commercial resins of highest molecular weight.

Typical polyethers of this invention have a substantial excess of non-epoxy end groups, i.e., phenol and alpha glycol groups, over epoxy end groups. However, in some cases, the polyethers of this invention may have a low total functionality and approximately equal proportions of epoxy and non-epoxy end groups, or a slight excess of epoxy end groups.

An outstanding property of the polyethers of this invention is their high impact resistance. One convenient test for measuring their impact resistance consists of preparing discs of 5/32 inch thickness and 1¼ inch diameter and testing them in a "Gardner variable impact tester", in which a weight is dropped on a sample from a variable height. The Gardner tester is normally used in testing impact resistance of surface coatings. The maximum impact which is produced in this test is 160 in.-lb. The Gardner test is described in "Physical and Chemical Examination of Paints, Varnishes, Lacquers and Colors" by Gardner and Sward, 11th Edition, 1950, pp. 173 et seq. and 188A and in "Organic Coating Technology" by H. F. Payne, vol. 1, John Wiley and Sons, New York, 1954, pp. 647–648.

A conventional method of measuring impact resistance of plastics is the Izod impact strength determined according to ASTM method D 256. The test can be carried out on a notched or an unnotched bar. In the former case, the impact resistance is reported in ft.-lbs./in. of notch and in the latter case in ft.-lbs./in. of bar width or in ft.-lb./sq. in.

A third method of measuring resistance to impact is the test for tensile impact strength, determined according to ASTM method D-1822-68.

Some polyethers of this invention have the unusual characteristic of being capable of breaking either in a brittle or a ductile manner when tested in the Izod impact test using a notched bar. In many cases, specimens of a single preparation, when tested as notched bars, showed an Izod impact strength of 2 to 5 ft.-lb./in. notch for brittle break and 17 to 32 ft.-lb./in. notch for ductile break.

It was found in a study in which high speed movies were made of test samples during impact and break in the Izod machine that even in the brittle break a considerable amount of bending of the bar is apparent prior to breaking. During this period of bending, transient strain patterns were built up to a considerable degree, but most of these strains were relieved immediately upon breaking of the specimen, indicating that the initial bending was an elastic deformation. This is also shown by hitting the specimen a blow which is insufficient to break it and observing the deformation and recovery by use of high speed movies. It was also observed that the bar tends to "fly apart" as the break occurs, which is interpreted as being caused by the rapid release of the energy stored in the elastic deformation.

These observations are of interest since they show that even the bars of the polyether product which fracture by "brittle" break have considerable elasticity, which is a very useful property for some possible uses. This behavior of the polyethers of this invention can be contrasted to that of general purpose polystyrene. When the latter is observed with the aid of high speed movies there is little or no elastic deformation observed, as indicated by no apparent bending of the specimen prior to breaking and only a slight indication of strain formation.

For further purpose of comparison, it is known that nylon 66 shows a notched Izod impact strength of 0.9 to 2 ft.-lb./inch of notch, but is nevertheless recognized to be a tough material. Its reported tensile impact strength is approximately 350 ft.-lb./cu. inch.

It was also observed that samples of polyethers of this invention failed by ductile deformation without tearing or breaking when tested as unnotched Izod bars. The unnotched impact values measured on a 0.5 inch thick bar were in the range of 43 to 70 ft.-lbs./inch of bar width. This contrasts with results on unnotched Izod bars made from a commercial grade of high impact polystyrene which gave a brittle break and had an impact resistance of only about 10 ft.-lb./inch width of bar.

The polyethers of this invention also have a high tensile impact strength, comparable with that reported for polycarbonate resins. Measured according to ASTM method D-1822-68, the tensile impact strength of typical polyethers of this invention is in excess of 100 ft.-lb./sq. in. (LS).

In the illustrative examples, results of various other tests are reported, including the following standard tests (the number in parentheses is the ASTM test designation): Tensile properties, including elongation (D 638); Rockwell hardness (D 785); heat distortion temperature (D 648); flexural properties (D 790); and dielectric properties (D 150).

A suitable method for the quantitative determination of epoxide content of the products is the perchlorate method, in which the 1,2-epoxy groups react stoichiometrically with hydrogen bromide generated by the reaction of perchloric acid with tetraethylammonium bromide; the end point of the reaction is indicated by a color change in crystal violet indicator.

An important characteristic of thermoplastic polymer products is their intrinsic viscosity (I.V.). The following quotation from Thorpe's Dictionary of Applied Chemistry, 4th Edition, gives a succinct definition of this term.

"In the field of high-polymer viscometry, the following functions of the dynamic viscosity of the solution ($\eta$), of the pure solvent ($\eta_0$), and of the concentration, c., measured in different units by different workers but necessarily defined explicitly in all examples, are generally accepted:

"The relative viscosity of the solution ($\eta_r$) is given by $$\eta_r = \eta/\eta_0$$

"The specific viscosity of the solution $\eta_{sp}$ is given by $\eta_{sp} = (\eta/\eta_0) - 1$ (This function is also called 'The relative viscosity' and denoted by $\eta_s$).

"The intrinsic viscosity of the solution [$\eta$] is given by $$[\eta] = \lim_{c \to 0} (\eta_{sp}/c) = \lim_{c \to 0} (\log_e \eta_r/c)."$$

The solvent in which I.V. is determined can significantly affect the values obtained. Unless otherwise indicated, the intrinsic viscosities herein are determined at 25° C. in 1,2-dimethoxyethane and given in units of deciliters per gram (dl./g.).

There is a fixed relationship between intrinsic viscosity and average molecular weight, which has been expressed by Staudinger, Mark and Houwink as $$[\eta] = KM^a$$

where K and $a$ are the intercept and slope, respectively, of a log-log plot of [$\eta$] versus M. This relationship is unique for each particular type of polyether of this invention, since it is sensitive to molecular structure and to molecular weight distribution; these, in turn, are generally functions of the feed compounds and impurities present in the feed. In this relationship, K and $a$ generally are constant for a limited molecular weight range. The following are typical relationships determined for certain polyethers produced according to this invention, as illustrated in the following examples.

| Examples illustrating polyether type | Applicable range, $\bar{M}_w \times 10^{-4}$ | Relationship |
| --- | --- | --- |
| 1-3, 5-8, 24 | 3 to 20 | [$\eta$] 0.0143 $\bar{M}_w^{0.30}$. |
| 11, 22 | 7 to 65 | [$\eta$] 0.0705 $\bar{M}_w^{0.145}$. |
| 29 | 6 to 35 | [$\eta$] 0.0930 $\bar{M}_w^{0.12}$. |

Accordingly, I.V. values of 0.4 generally correspond to weight average molecular weights of about 50,000 to about 200,000 for the illustrated polyethers. At higher intrinsic viscosities, the correlation with molecular weight covers a much broader molecular weight range, depending on the particular constitution of the individual polyether product. For those prepared from pure p,p'-bisphenol A and its diglycidyl ether, for example, an I.V. of 1.0 corresponds to somewhat over 1,000,000. For those prepared from equivalent feeds of technical purities, I.V. values of 0.5 to 0.6 correspond to about 1,000,000 molecular weight.

The polyethers of this invention have intrinsic viscosities of at least 0.3 dl./g., usually between 0.35 and 1.0, and preferably between 0.35 and 0.55 if they are to be used for molding, and have weight average molecular weights of at least about 25,000 and usually between 50,000 and 1,000,000. Polyethers of this invention may have still higher intrinsic viscosities and molecular weights.

In the production of polyethers of this invention by the condensation methods of our U.S. Pat. 3,306,872, there is a steady increase of average molecular weight and of I.V. during the course of the reaction. When polyethers are produced under otherwise identical conditions but recovered at various stages of the reaction, those recovered at an early stage have a low intrinsic viscosity and poor impact resistance. Products recovered after longer retention times are found to have increasingly higher intrinsic viscosities. As a critical lower I.V. limit is approached and then exceeded, the impact resistance improves drastically and then levels out at a high value. In polyethers of Formula IX in which X is 2,2'-(p,p'-bisphenylene)propane, the residue group of bisphenol A, the critical value above which the products have satisfactory impact resistance is 0.3 dl./g.

It will be understood that it is not practically possible to obtain absolute absence of branching, and it will be evident that the amount of branching present in a given product type will be greater at higher molecular weights or when undesirable impurities were present or adverse conditions used during the reaction. However, by operating, for example, at reaction conditions and with feeds described in our U.S. Pat. 3,306,872, polymers are produced which can properly be designated linear in accordance with industrial practice. In accordance with such practice, linear polymers are those in which the degree of branching present is sufficiently small to produce no substantial adverse effect on properties associated with linearity, e.g., solubility in organic solvents. The polyethers of this invention are linear resins within the scope of this definition.

The polyether products of this invention are mixtures of molecules of different molecular weights. They consist essentially of linear molecules characterized by the formulas given above. The total polyether products have the stated physical and chemical properties. A limited fraction extracted from the total products may have different properties, e.g., lower impact resistance.

Polyether products of this invention may be produced by the carefully controlled reaction of dihydric phenols with epihalohydrins, e.g., of bisphenol A and epichlorohydrin. They are preferably produced by the condensation of a dihydric phenol with a diepoxide.

Preferred method for producing polyethers of this invention by condensation of dihydric phenols and diepoxides are described in detail and claimed in our U.S. Pat. 3,306,872, which issued on a parent application of this application, and is incorporated herein by reference. They are summarized below and illustrated in the examples.

The condensation reaction is carried out in the presence of a basic condensation catalyst, which may, for example, be added as a concentrated aqueous solution of sodium or potassium hydroxide or a sodium salt of a phenol, suitably a sodium salt of the same dihydric phenol which is used as a reactant.

The concentration of catalyst present during the condensation reaction must be held to a very low value; otherwise branched polymers of low impact value are produced. However, reaction rates increase proportionately with catalyst concentration. The useful range of catalyst concentration is from 0.005 to 0.100 mole per mole of the contained bisphenol, preferably between 0.010 and 0.025 mole per mole.

The water content of the reaction mixture is kept below 1% by weight and should be kept as low as possible.

In producing the polyethers of this invention by the condensation of dihydric phenol and diglycidyl ether according to said U.S. Pat. 3,306,872, the reaction mixture is controlled to contain not less than 0.980 and not more that 1.025 vic-epoxide groups (the group

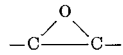

generally referred to herein as "epoxy" group) per phenolic hydroxide group, and preferably from 0.999 to 1.005 epoxy groups per phenolic hydroxide group. A slight excess of epoxy groups is preferred to even a very small excess of phenolic hydroxyl groups. When the catalyst employed is a basic salt of a dihydric phenol, then the phenol present in the catalyst is considered part of the phenolic reagent for purposes of calculating the proper ratio of reactants. Similarly, when the technical grade of the diepoxide contains some saponifiable chlorine, the chlorohydrin groups are considered the equivalent of epoxy groups since they are converted thereto during the condensation reaction in the presence of a basic catalyst.

The condensation reactions of said U.S. Pat. 3,306,872 are carried out in solution in inert solvents.

Desired high impact resistance is a property which requires complete removal of solvent from the polyether product. In the production of polyethers of this invention for use in molding, extrusion, and the like, solvent is removed from the reaction mixture. In the production of polyethers for surface coatings, the polyether may remain associated with solvent until it is actually applied as a coating and the solvent is removed by evaporation under suitable conditions.

Useful reaction solvents, which are also suitable solvents for the finished polyether products are, for example, certain ketones, halogenated hydrocarbons and ethers. Methyl ethyl ketone is a preferred solvent. Cyclohexanone, mesityl oxide and other ketones may be used. Chloroform, 1,2-dichloroethane and other chlorinated hydrocarbons may be used, particularly in admixture with ketones. Ethers, such as dioxane, tetrahydrofuran, dimethoxyethane and lower alkyl (methyl or ethyl) ethers of ethylene glycol are suitable, alone or in admixture with ketones. Other solvents which meet the above criteria may be employed if desired.

Particularly useful polyethers according to this invention can be produced by the reaction of 2,2-bis(4-hydroxyphenyl)propane and the diglycidyl ether thereof or its derivatives. The phenolic compound is often referred to in industry as "p,p'-bisphenol A"; a technical grade of the named compound is generally referred to simply as "bisphenol A." These terms are at times used herein for convenience of reference.

The description of this invention will be made in substantial part by reference to preferred polyethers, which are suitably produced by reacting p,p'-bisphenol A with diglycidyl ethers or diglycidyl polyethers prepared from p,p'-bisphenol A and epichlorohydrin.

In preparing the polyether products of this invention by the methods of U.S. Pat. 3,306,872, the dihydric phenols may be substantially 100 percent pure, or may be technical grades of somewhat lower purity. Concentrates of dihydric phenols containing, for example 90 to 100 percent of the pure compound may be used. The epoxy reagents may be diepoxides or crude concentrates containing a substantial proportion of diepoxide. It is important, however, that the crude reagents are free of monoepoxide and of monohydric alcohol or phenol. Products having very similar properties can be in many cases obtained by employing a crude mixture containing at least 70 to 85% of diglycidyl ether of a dihydric phenol but no monoepoxide, monohydric alcohol or monohydric phenol or by employing the purified diglycidyl ether. The crude diglycidyl ether concentrate typically is a viscous liquid having a number average molecular weight of about 350 and an epoxide value of 0.50 epoxide equivalent per 100 grams. A typical preparation is described in U.S. 2,633,458 to Shokal under "Polyether A."

Another particularly useful group of diepoxides for preparing the polyether products of this invention are the diglycidyl polyethers produced by reacting bisphenol A with epichlorohydrin in the presence of a basic compound at ratios of epichlorohydrin to bisphenol A substantially below 5:1, e.g., down to about 1.45:1. A particularly preferred polyether of this type, prepared at epichlorohydrin to bisphenol A ratios between 1.45:1 and 1.60:1, has a Durran's mercury method melting point of about 70° C., a number average molecular weight of about 900 and an epoxide value of about 0.20 equivalent per 100 grams.

At higher epichlorohydrin to bisphenol A ratios, the properties of the diepoxide are intermediate between those of the one just described and the crude diglycidyl ether product. In general, suitable reaction products of epichlorohydrin and bisphenol A for use as diepoxides in preparing polyether of this invention are those prepared as described in the said Shokal patent U.S. 2,633,458 having number average molecular weights from about 340 to about 2,000. This includes polyethers A through E of said patent. These products are lower polyethers containing an average of from 1 to about 6 residue groups of the bisphenol per molecule.

The following examples illustrate polyether products of this invention and their preparation. The invention is not to be considered as limited by the examples.

EXAMPLE 1

To a vessel containing methyl ethyl ketone are added substantially 100% pure p,p'-bisphenol A, substantially 100% pure diglycidyl ether of p,p'-bisphenol A and 60% aqueous solution of benzyltrimethyl ammonium hydroxide in a molar ratio of 1.0:1.0:0.02. The mixture is made up to contain 67% by weight of active reactants. The solution is heated to reflux temperature, with stirring, and maintained at that temperature, about 80° C., for 13 hours. Chloroform is then added in an amount which decreases the concentration of reactants (including product) to 57% by weight. After 28 hours total time, additional chloroform is added in an amount which decreases the concentration of reactants to 50% by weight.

After a total reaction time of 57 hours, the solution is cooled, an equal volume of chloroform added thereto, and the resultant solution washed twice with volumes of water equal to the volume of resin solution. The polyether-rich phase is then stabilized in a vacuum oven at a temperature of 160° C. and 50 mm. mercury for six hours.

The stabilized polyether product is dissolved in dioxane to produce a solution of about 15% polyether content and the solution poured as a fine stream into ten times its volume of cold water (0–15° C.) with vigorous agitation. This results in dissolving dioxane out of the polyether solution into the aqueous phase and leaves the substantially solvent-free polyether product as a suspension of shreds or fibers. These are recovered by filtration and resuspended in an amount of cold water approximately the same as that employed in the previous step. The washed shreds are recovered by filtration and dried in a vacuum oven.

Shredded polyether product prepared in this manner has a softening range of 145–185° C. and an intrinsic viscosity of 0.35 to 0.45 dl./g.

The shredded dried polyether product is compression molded into discs. These discs withstand the maximum 160 inch-pounds of impact in the Gardner variable impact tester without breaking or cracking.

EXAMPLE 2

A polyether is prepared in a slight modification of the procedure of Example 1, using the same reagents, namely, pure p,p'-bisphenol A, pure diglycidyl ether of p,p'-bisphenol A, and as catalyst 60% aqueous benzyltrimethyl ammonium hydroxide. A solution containing 30% by weight of reactants in methyl ethyl ketone is prepared and reacted at a temperature of 78°–80° C. for a period of 40 hours. No additional solvent is added while reaction is in progress. The cooled reaction product mixture is diluted with an equal volume of chloroform, washed with water, and the polyether-rich phase stabilized as in Example 1. The stabilized product is dissolved in dioxane and poured into water under a high degree of agitation as described. The discs produced by compression molding from the resulting shreds withstand the maximum impact of 160 inch-pounds in the Gardner variable impact tester without breaking or cracking and have a softening range of 155–186° C.

EXAMPLE 3

Polyether product is prepared from an equimolar mixture of pure p,p'-bisphenol A and pure diglycidyl ether of p,p'-bisphenol A in a modification of the procedure of Example 1. Monosodium salt of p,p'-bisphenol A, in a concentration of 0.02 mol per mol of bisphenol A, is employed as catalyst. The amount of free bisphenol A employed is, therefore, 0.98 mol per mol of diglycidyl ether. The reactants are dissolved in methyl ethyl ketone to produce a solution consisting of 40% by weight of reactants. Reaction is carried out at 80° C. with stirring for 108 hours. Washing, stabilization, shredding, and drying steps are carried out according to the procedure described in Example 1, with the exception that acetic acid is added during the water washing of the solution. One mol of acid is added for each mol of sodium ion present.

Polyether product prepared in this manner has a softening range of 255–310° C. and an intrinsic viscosity of 0.85–1.2 dl./g. Compression molded discs of the product withstand the maximum 160 inch-pounds of impact in the Gardner variable impact tester without breaking or cracking.

EXAMPLE 4

A portion of the stabilized reaction product of Example 3 is dissolved in ethylene glycol monomethyl ether to produce a solution containing 7 percent by weight of the polyether of Example 3. This solution is poured as a fine stream into seven times its volume of acetone with vigorous agitation. The solvent-rich phase is decanted and the precipitated polyether is agitated vigorously with normal hexane equalling in volume that of the acetone used previously. The resultant shreds are dried in a vacuum oven. By this procedure, about 13% of the original polyether product remains in solution and the recovered shreds represent 87% of the original product. The fraction remaining in solution consists of the lowest molecular weight components. Compression molded discs of the polyether withstand the maximum 160 inch-pounds of impact in the Gardner variable impact tester without breaking or cracking.

EXAMPLE 5

A polyether product is prepared from an equimolar mixture of pure p,p'-bisphenol A and pure diglycidyl ether of p,p'-bisphenol A. In this instance, the catalyst employed is potassium hydroxide, added as a concentrated aqueous solution in an amount equivalent to 0.044 mol KOH per mol of bisphenol A. The reagents are dissolved in methyl ethyl ketone to produce a solution containing 37.8% of reactants. The reaction is carried out at 75 p.s.i.a. pressure at a temperature of 140° C. for 1.5 hours. No additional solvent is added during the reaction or prior to the washing step. The reaction mixture is washed with a mixture of water, methyl ethyl ketone and $CO_2$, the latter in sufficient amount to neutralize the catalyst. The mixture is stabilized, the stabilized product dissolved in dioxane and shredded polyether product recovered as described in Example 1. Compression molded discs of this product withstand the maximum impact of 160 inch-pounds in the Gardner variable impact tester and have a softening range of 145° to above 150° C.

EXAMPLE 6

A polyether product is prepared from one mole of pure diglycidyl ether of p,p'-bisphenol A, and 0.95 mol of pure p,p'-bisphenol A, using as catalyst 0.05 mol of the monosodium salt of p,p'-bisphenol A. The reactants are dissolved in methyl ethyl ketone to produce a solution containing 40% by weight of reactants. The reaction time is 38 hours at 80° C. Dioxane is added after completion of the reaction. The reaction mixture is not separately washed as such. A mixture of dioxane and methyl ethyl ketone is added to the total reaction mixture and the resulting solution poured under vigorous agitation into cold water containing sufficient acetic acid to neutralize the catalyst. The resulting shredded polyether product is washed and dried. Compression molded discs prepared therefrom withstand the maximum impact of 160 inch-pounds in the Gardner variable impact tester and have a softening range of 165°–195° C.

EXAMPLE 7

A polyether product is prepared from pure p,p'-bisphenol A and pure diglycidyl ether of p,p'-bisphenol A by dissolving 1.0 mol of the ether, 0.9 mol of the free phenol, and 0.1 mol of monosodium salt of p,p'-bisphenol A in methyl ethyl ketone to produce a solution containing 40% of reactants. The reaction is carried out for 16 hours at 80° C. After completion of the reaction ethylene glycol monomethyl ether is added in place of the dioxane of Example 6. As in Example 6, the reaction mixture is not washed. Solid polyether product is recovered by adding a mixture of ethylene glycol monomethyl ether and methyl ethyl ketone and pouring the resulting solution into a mixture of water and acetic acid under vigorous agitation. The resulting shredded product is recovered and dried. Compression molded discs thereof withstand an impact of 160 inch-pounds in the Gardner variable impact tester and have a softening range of 180–205° C.

EXAMPLE 8

A polyether product is prepared from pure p,p'-bisphenol A and pure diglycidyl ether of p,p'-bisphenol A, using as catalyst monosodium salt of bisphenol A. The reactants are employed in a ratio of 0.98 mol of free phenol per mol of ether, with 0.02 mol of catalyst. The reactants are dissolved in ethylene glycol monomethyl ether to produce a solution containing 50% by weight of reactants. The reaction is carried out for 22 hours at a temperature of 100° C. During the course of the reaction, chloroform is added as additional solvent, finally reducing the concentration of reactants (including product) to 30% of the total reaction mixture. After completion of the reaction, the reaction mixture is washed with an aqueous solution of acetic acid in the manner described in Example 3 and is stabilized. The resulting stabilized solid product is dissolved in an additional amount of ethylene glycol monomethyl ether and poured as a thin stream into an agitated mass of cold water as described in Example 1.

A compression molded disc prepared from the resulting shredded product has an extremely low impact resistance of less than 4 inch-pounds in the Gardner variable impact tester. Example 9, below, illustrates that the low impact resistance of this product is due to the presence of a substantial amount of material of excessively low molecular weight in the reaction product.

EXAMPLE 9

A reaction mixture is prepared, washed and stabilized in a manner identical to Example 8. The stabilized product is dissolved in 10 mol of ethylene glycol monomethyl ether per gram of polyether and the resultant solution poured with vigorous stirring into ten times its volume of a 5:2 volume mixture of acetone and n-hexane. The resulting resin-rich liquid phase is separated, diluted with about five volumes of ethylene glycol monomethyl ether and poured under vigorous agitation into ten times its volume of cold water (0.–5° C.). Shreds are thus formed; they are dried in a vacuum oven. The solid product obtained in this manner contains only about 75% by weight of the original stabilized polyether product. The amount removed is low molecular weight material. Compression molded discs of the recovered higher molecular weight portion of the resin withstand 160 inch-pounds of impact in the Gardner variable impact tester without breaking or cracking and have a softening range of 140–160° C.

EXAMPLE 10

A polyether product is prepared from a mixture of 99.7% pure p,p'-bisphenol A and substantially 100% pure diglycidyl ether of p,p'-bisphenol A. The catalyst employed is the monosodium salt of p,p'-bisphenol A in a concentration of 0.04 mol per mol of bisphenol. The reactants are employed in a ratio of 1.00 mol of the ether per 0.96 mol of free bisphenol, in 30% by weight solution in methyl ethyl ketone. The reaction is carried out for 6.5 hours at 120° C. Shreaded reaction product is recovered in a manner similar to Example 3.

Polyether produced in this manner has a melting range of approximately 140–160° C. and an intrinsic viscosity of 0.4 dl./g., measured in 1,2-dimethoxyethane. Its weight average molecular weight is greater than 100,000. When the procedure is modified by increasing the reaction time, products having a high intrinsic viscosity, up to 1.1 and high melting range, up to 300° C. are produced. Compression molded specimens of the polyether product of 0.4 I.V. easily withstand an impact of 160 inch-pounds in the Gardner variable impact tester.

EXAMPLE 11

A polyether product is prepared from a standard technical grade of bisphenol A, a commercial product which contains about 92 to 96.5% of p,p'-bisphenol A, and from a commercial reaction product of the same grade of bisphenol with epichlorohydrin, which reaction product contains about 70–78% of the pure diglycidyl ether of p,p'-bisphenol A, the remainder being mostly higher condensation products. The content of phenolic hydroxyl groups of the bisphenol and of epoxy groups of the ether are determined by standard tests. The reaction mixture is made up to contain one equivalent of epoxide functionality to one equivalent of phenolic functionality, including in the latter the amount of phenol present in the catalyst. The catalyst is 0.05 mol of the monosodium salt of p,p'-bisphenol A per mol of bisphenol in the reaction mixture. The total reactants are present in a concentration of 40% by weight in methyl ethyl ketone. The reaction temperature is 78° C. and the reaction time 72 hours. Solid product is recovered by diluting the reaction mixture with an equal weight of dioxane and pouring the solution with vigorous agitation into ten volumes of ice water containing some excess of acetic acid over that required to neutralize the catalyst. The shreds are washed with water and dried for 16 hours at 100° C. in a blower oven.

The product is molded into discs at 160° C. and 1,000 p.s.i. After aging overnight the discs withstand 160 inch-pounds of impact in the Gardner variable impact tester without breaking or cracking.

EXAMPLE 12

A product is prepared similarly to Example 3 except that the reactants are used in the ratio of 1.05 mol of the diglycidyl ether of bisphenol A per 1.00 mol of bisphenol A (including bisphenol in the catalyst.) The resulting reaction product is a gel, formed through reaction of the epoxide groups with alcoholic groups along the chain, rather than a linear polymer.

Another product is prepared similarly to Example 3, but using a reactant ratio of 1.05 mol of bisphenol per mol of diglycidyl ether of bisphenol. The reaction product is a resin having a much lower molecular weight than otherwise obtained, and having unsatisfactory impact resistence.

EXAMPLE 13

The following illustrates a method for preparing polyether products of this invention which is particularly suitable for production on a larger scale. A mixture of a dihydric phenol and diglycidyl ether in a molar ratio of 1.00 to 1.00 is prepared in solution in a suitable solvent such as methyl ethyl ketone. The reactant concentration is suitably 40% by weight. As catalyst there is used 0.02 mol sodium hydroxide per mol of dihydric phenol, added in the form of 45% aqueous solution. The reaction mixture is placed in a closed vessel having reflux means and sampling means and is brought to a temperature of 120° C. The viscosity of the reaction mixture is determined on samples which are taken either continuously or periodically; commercially available viscosity determining apparatus is used. The viscosity of the reaction mixture at any given time can be correlated with the intrinsic viscosity of the polyether produced up to that time. For this purpose one employs a calibrating curve, conveniently produced in known manner from a series of preliminary small scale laboratory tests. When the viscosity of the reactant solution has reached a value which corresponds to the desired intrinsic viscosity of the product, the reaction is stopped by adding sufficient carbon dioxide to the reaction mixture to neutralize the sodium hydroxide present. $CO_2$ is conveniently added by merely pressuring the required amount into the gas space of the reactor and permitting the stirring action to carry it into the reaction mixture. If desired, it may also be injected directly into the liquid mixture. Another acid could be employed, e.g., HCl. This might create corrosion problems while not providing any advantages over the use of $CO_2$. After $CO_2$ has been added, there is no additional significant amount of reaction even through the elevated temperature is maintained for a considerable time thereafter.

In a series of illustrative experiments, the desired intrinsic viscosity was 0.30 and the actual intrinsic viscosities of the polyether products produced in this manner varied by no more than 0.02 unit from the target value. The reaction times required to produce the desired polyether products ranged from 4.8 to 5 hours.

After termination of the reaction by addition of $CO_2$, the product is recovered from the reaction mixture in a manner similar to Example 1. The polyether product produced according to this procedure withstands 160 inch-pounds when tested by the Gardner variable impact tester.

EXAMPLE 14

In the production of polyether products in accordance with Example 13, part of the neutralized catalyst tends to remain in the final product as sodium bicarbonate or carbonate. This residue is not generally objectionable. However, it may be removed to a level of less than 0.1 milliequivalent per 100 grams by washing the solution of the polyether, after dilution with additional methyl ethyl ketone to a resin content of 20%, twice with one half volume of water saturated with methyl ethyl ketone at room temperature. Wash and product solution are separated by centrifuging or by settling, preferably at an elevated temperature, e.g., 60–70° C.

Catalyst residue may be unobjectionable when it remains dissolved in the solution. Residues are generally soluble when the catalyst is potassium hydroxide, or when the neutralizing acid is an organic acid, e.g., acetic acid.

EXAMPLE 15

In the production of polyether according to this invention, the product remains in solution throughout the reaction period. Solid product is recovered by precipitation from the reaction solutions with simultaneous solvent removal. A preferred method of precipitation is by pouring the solution under strong agitation into a large mass of liquid, such as water, which is a non-solvent for the polyether product and a solvent for the solvent in which the product has been dissolved.

It has been found that methyl ethyl ketone, which is a preferred solvent for use in the reaction step, has a peculiar solubility relationship with the polyether products. One peculiarity consists in the fact that a solution containing on the order of 30 to 40% or more of the polyether product, the remainder being methyl ethyl ketone, consists of a single phase at temperatures in the range in whcih washing and recovery are carried out, while addition of more methyl ethyl ketone to reduce the solids content of the solution to about 20% by weight causes a separation into two phases, one containing mainly methyl ethyl ketone and the other mainly polyether product. For this reason, it was considered necessary to carry out the required dilution of the reaction solution with a superior solvent for the polyether product, e.g., dioxane. This, of course, is an expensive step in a commercial process.

It was surprisingly found that when as little as 1 to 3% by weight of water is added to methyl ethyl ketone employed for diluting the solution of polyether product in methyl ethyl ketone, then the resulting mixture remains as a single liquid phase and can be worked up equally as well as a methyl ethyl ketone-dioxane solution.

Taking advantage of this finding, therefore, a useful method for preparing polyether products of this invention is as follows:

A reaction mixture is prepared and heated to reaction temperature. The viscosity of the reaction mixture is determined continuously or intermittently and compared with a calibration curve. When the reaction mixture has achieved a predetermined viscosity corresponding to a desired intrinsic viscosity of the reaction product, e.g., at least about 0.3 dl./g., $CO_2$ is added to the reaction mixture in some excess over the amount required to neutralize the sodium hydroxide catalyst therein. The reaction mixture is diluted to a solid content of about 20% by weight by adding thereto a solution of 1 to 3% by weight of water in methyl ethyl ketone; the reaction mixture is then washed twice with one-half volume of water saturated with methyl ethyl ketone, and then poured under vigorous agitation into ten times its volume of cold water. The resulting solid polyether shreds are filtered and dried.

EXAMPLE 16

It is known that with some resins, the retention of small amounts of low molecular weight material results in substantial loss of impact resistance. In a series of tests of products prepared according to Example 13, it was found that the impact resistance of the product was not affected by variations of water content in the range from 0 to 1% by weight of the resin. However, products containing more than 0.1% by weight of methyl ethyl ketone consistently showed poor impact resistance while those containing less than 0.05% methyl ethyl ketone showed good impact resistance. Products containing methyl ethyl ketone in the range between 0.05 and 0.1% by weight gave erratic results on impact tests.

These results emphasize the importance, when carrying out the preparation in solution, of complete removal of organic solvent from the polyether product in the precipitation and drying step in order to produce products of high impact resistance.

EXAMPLE 17

A polyether product is prepared in the manner similar to Example 3 from a reaction mixture containing 40% by weight reactants in methyl ethyl ketone solvent, the reactants consisting of equimolar parts of p,p'-bisphenol A (adjusted for phenol content of the catalyst) and diglycidyl ether of p,p'-bisphenol A and the catalyst being 0.025 mol per mol of phenol of the monosodium salt of p,p'-bisphenol A. The reaction time is 65 hours at 78° C. Shredded polyether product is recovered as in Example 1, i.e., without neutralization of the alkaline catalyst.

A portion of dried shredded product produced as described was compression molded and tested immediately after it was produced. Another portion of the product was stored for three months. It was observed that on three months' storage at room temperature additional reaction had taken place.

Comparison of the properties of the product showed that the intrinsic viscosity had increased from 0.33 to 0.46 and the softening range from 140°–170° C. to 200°–255° C. The epoxide content of the product had decreased from 0.008 to 0.003 equivalents per 100 grams resin and the Izod impact resistance, expressed as ft.-lb./in. notch had increased from values of 1.5–1.6, tested on two specimens, to the following results on four specimens tested: 1.5, 16.1, 16.4, and 22.1.

EXAMPLE 18

Commercially produced bisphenol A frequently contains a trisphenolic component, specifically 2,4-bis($\alpha,\alpha$-dimethyl-p-hydroxybenzyl)phenol. A polyether product is prepared in which the reaction mixture consists of pure diglycidyl ether of p,p'-bisphenol A and sufficient of the above-mentioned trisphenol to provide 4.4% of the initial phenolic hydroxyl functionality. The reaction is carried out substantially as in Example 13. It is found that the time required to reach the requisite reaction mixture viscosity is shorter than in said example. The resin is recovered as in Example 13. It is found, when compared with a product of the same intrinsic viscosity prepared from the pure bisphenol and diglycidyl ether of bisphenol to have substantially identical notched Izod impact resistance, a substantially higher softening range (284–313° C.), and a higher heat distortion temperature (92.5° C.).

EXAMPLE 19

The solubility of the polyether product of this invention is greater in dimethoxymethane than in methyl ethyl ketone. Consequently, when it is desired to produce a product of a relatively high intrinsic viscosity the reaction is more conveniently carried out in dimethoxyethane since this avoids the production of an excessively viscous solution and the possibility of phase separation.

A reaction for the production of a product of a relatively high intrinsic viscosity is carried out by reacting pure diglycidyl ether of p,p'-bisphenol A and pure p,p'-bisphenol A as a diepoxide to total phenol molar ratio of 1.0:1.0, using as catalyst 0.013 mol of monosodium salt of bisphenol per mol of bisphenol A. The reactants are placed in dimethoxy ethane to provide a solution containing 40% by weight of the reactants. Water concentration in the solution is 0.03% by weight. The reaction is carried out at reflux for 17.5 hours at which time the viscosity of the solution indicates the resin to have an intrinsic viscosity of 0.55 dl./g. At this point, stirring is limited by the high viscosity of the solution. The reaction mixture is diluted to about 20% by weight reactants by adding additional dimethoxyethane. The run is terminated after 11 more hours when the levelling off of change in solution viscosity indicates that the reaction rate has become very low. The solution is washed and product is recovered as in Example 1.

On testing a number of specimens prepared by molding dried shreds produced as described, it was found that four out of six bars tested had an Izod impact resistance of 20 ft.-lbs./in. notch and showed ductile breaks and two specimens had an Izod impact resistance of 4.5 ft.-lbs./in. notch and showed brittle breaks.

A portion of the wet shreds was dried and mixed by processing on a two-roll mill. Specimens molded from this material showed similar results on impact testing to the specimens produced by molding the shreds.

EXAMPLE 20

The method of Example 19 is repeated with the exception that the water content of the reaction mixture is increased from 0.03 to 1.0% by weight. This increase in water content results in a nearly ten-fold increase in alpha glycol formation, the major portion of this increase occurring within the first twelve hours of the reaction. Under the reaction conditions, the alpha glycol end group reacts very slowly, if at all, with epoxide functionality and hence the glycol acts as a chain terminator. It is also observed that the rate of disappearance of phenolic hydroxyl functionality in the system containing 1.0% water is only one-half to one-third that in the reaction containing 0.03% by weight of water. It is evident from these results that increasing the water content of the reaction system not only reduces the ultimate attainable molecular weight of the polyether products but also significantly reduces the rate of reaction.

EXAMPLE 21

A large sample of polyether product is prepared from 99.7% p,p'-bisphenol A and pure diglycidyl ether of p,p'-bisphenol A at 120° C. at a catalyst level of 0.02 mol sodium hydroxide per mol of bisphenol A, a reactant molar ratio of 0.995 diglycidyl ether of bisphenol A per 1.00 of bisphenol A and an initial concentration of reactants of 40% by weight in metyhl ethyl ketone. The product is recovered in shredded form according to Example 3.

The product is fractionated to produce five portions of successively higher narrow molecular weight ranges by dissolving it in monomethyl ether of ethylene glycol to produce a 5% by weight solution and precipitating successive fractions therefrom by successive additions of acetone. Each fraction is recovered from the resulting resin-rich phase by precipitation with water under rapid, strong agitation and dried at 170° C. for 48 hours. The fractions range from 0.3 to slightly over 1.0 in intrinsic viscosity; the intrinsic viscosity of the whole polymer is 0.77. Prior to molding, the fibrous materials are milled at 190° C. for five minutes, except the lightest fraction, which is milled at 100° C. for five minutes.

Izod impact bars were prepared by compression molding of samples prepared as described. In testing the notched bars, it was found that the lowest molecular weight fraction, which had an intrinsic viscosity of 0.3, fractured only in the brittle manner and showed consistently low values. The remaining fractions whose intrinsic viscosity was in the range from 0.5 to 1.0 exhibited both brittle and ductile break.

In testing of the unnotched bars, all samples fractured with a ductile break and had values in the range from 30 to 50 ft.-lbs./in. of width.

For purpose of comparison with the above samples which were tested after milling, specimens were also prepared from an unmilled portion of a fraction having an intrinsic viscosity of 0.3 and a fraction having an intrinsic viscosity of 0.8. The tests on these samples agreed with the tests on the milled samples, showing that milling did not affect the impact resistance of the molded specimens.

To investigate the effect on Izod impact behavior of low molecular weight components present in low concentration, a prorated blend was reconstituted from the above fractions, omitting the fraction of lowest molecular weight. The impact values for the reconstituted sample were similar to those for the whole polymer.

EXAMPLE 22

For reasons of economy, it is desirable to produce linear polyether products in accordance with this invention from commercially available grades of phenols and diglycidyl ethers. In accordance with this objective, a preparation is made using a commercial grade of bisphenol A and a commercial grade of condensation product of epichlorohydrin and commercial grade bisphenol A, containing 70–80% of the diglycidyl ether of p,p'-bisphenol A. The reactants are used in a ratio which provides 0.992 epoxide equivalents per 1.00 phenolic hydroxyl equivalents. The catalyst is added as a 45% aqueous solution of sodium hydroxide in sufficient amount to provide the amount of sodium hydroxide required to react with the saponifiable chlorine content of the polyepoxide as well as 0.0125 mol of sodium hydroxide per equivalent of phenolic hydroxyl group. For a saponifiable chlorine content of the polyepoxy reactant of 0.08% by weight, the total amount of sodium hydroxide required is found to be 0.0166 mol per mol of phenol. In determining the epoxy group equivalency, the saponifiable chlorine is also considered equivalent to the proportionate amount of epoxy groups since it is converted thereto in the course of the reaction. The reaction is carried out with 40% by weight of reactants in methyl ethyl ketone at 120° C. reaction temperature. The reaction is discontinued by adding an excess of $CO_2$ after the desired viscosity has been attained.

In multiple preparations, it is found that the reaction time required to attain a desired viscosity varies widely even though the reactants employed are quite similar. However, the products of the reactions have substantially identical properties.

EXAMPLE 23

A polyether product is prepared according to Example 13. The neutralized polymer solution is twice washed with one half its volume of water. The washed solution, free of water, is gradually poured onto the upper roll of a two-roll mill operating at an elevated temperature. Solvent is quickly evaporated and the solid, solvent-free product sheeted off. Compression molded discs of this product resist 160 in.-lb. of impact in the Gardner variable impact tester.

EXAMPLE 24

A polyether product is prepared from a 40% by weight solution of pure p,p'-bisphenol A and diglycidyl ether of p,p'-bisphenol A in methyl ethyl ketone. The ratio of epoxide to phenolic hydroxy equivalent is 1.0:1.0. Catalyst is 0.02 mol of NaOH per mol of bisphenol A, added as a 45% w. aqueous solution. The reaction is carried out at 120° C. and terminated by addition of excess carbon dioxide after the desired viscosity is attained. The sodium content of the crude product solution is reduced below 0.1 milliequivalent per 100 grams resin by two washes with one half volume of methyl ethyl ketone-saturated water. The solid product is precipitated from solution with cold water under rapid agitation. After centrifuging, the wet shreds are dried in a forced draft oven at 80–90° C. for at least 24 hours. In two typical preparations according to this method, the following product properties are observed:

|  | Batch No. 1 | Batch No. 2 |
|---|---|---|
| Intrinsic viscosity | 0.37 | 0.34 |
| Epoxide, eq./100 g | 0.0051 | 0.0053 |
| Phenolic hydroxyl, eq./100 g | 0.012 | 0.011 |
| Alkalinity, meq./100 g | 0.04 | 0.04 |
| Secondary hydroxyl, eq./100 g | 0.331 | 0.332 |
| Methyl ethyl ketone, percent w | 0.08 | 0.08 |
| Water, percent w | 0.8 | 0.5 |
| Total chlorine, percent w | 0.03 | 0.02 |
| Inorganic chloride, percent w | 0.0035 | 0.0014 |
| Ash, percent w | 0.02 | 0.01 |
| Heat distortion temperature (264 p.s.i.), ° C | 89 | 86 |
| Vicat softening point, ° C | 100.2 | 96.5 |
| Impact strength, notched Izod, ft.-lb./in. notch (⅛" bar) (average) | 1.4 | 1.5 |
| Impact strength, unnotched Izod ft.-lb./in.$^2$ (average) | 93 | 106 |

Test samples were prepared from batch No. 1 above by injection molding. Various properties were determined on the samples, both in the unannealed state and in samples annealed 24 hours at 71° C. All samples were equilibrated at approximately 70° F. prior to testing.

Injection molding was carried out with a cylinder temperature of 585° F. The flow properties of the sample were satisfactory at these conditions. It was found, on the other hand, a commercial polycarbonate resin proved extremely difficult to mold even at the limiting conditions of 20,000 p.s.i. injection pressure (maximum machine pressure) and 600° F. cylinder temperature which are recommended by its manufacturer. It was observed that signs of darkening were evident when the polycarbonate resin was molded at this temperature using cycle times of 3 to 5 minutes while no signs of darkening were noted during molding at 585° F. of the polyether products of this invention.

The following tabulation shows the results of tests on the annealed and unannealed injection molded samples and, for comparison, typical values reported in the literature for polycarbonate resin:

|  | This invention | | Polycarbonate, unannealed |
|---|---|---|---|
|  | Unannealed | Annealed 24 hrs. at 71° C. |  |
| Tensile yield (2.0 in./min.), p.s.i. | 9,300–9,400 | 12,200–12,400 | 8–9,000 |
| Elongation (2.0 in./min.), percent | 88–150 | 5–8 | 60–100 |
| Tensile modulus, p.s.i.×10$^5$ | 3.5 | 3.8 | 3.2 |
| Flexural strength, p.s.i. | 16,700 | 18,800 | 11–13,000 |
| Flexural modulus, p.s.i.×10$^5$ | 4.1 | 4.37 | 3.75 |
| Notched Izod impact resistance, ft.-lb./in. notch (⅛" bar) | 2.2–2.6 | 1.3 | 12–16 |
| Unnotched Izod impact resistance, ft.-lb./in. width (0.5" bar) | 57–67 | 62–63 | 60 |
| Tensile impact, ft.-lb./in.$^3$ | 515–875 | 250–520 | 600–900 |
| Heat distortion temperature, ° C.: |  |  |  |
| 264 p.s.i. | 81 | 92 | 138–143 |
| 66 p.s.i. | 89 | 94 | 139–145 |
| Hardness, Rockwell | M57 | M72 | M70 |

In a comparison of the unannealed polyether with polycarbonate, the following can be observed: The tensile properties of the product of this invention are very similar to the polycarbonate, its flexural strength is about 50% higher and the tensile modulus about 10% higher. The impact resistance is equivalent when testing the unnotched Izod impact bars, but shows a lower value for the product of this invention when testing the notched bars. These specimens showed a brittle fracture. However, as has been pointed out above, the impact test on the notched bar is not entirely indicative of the impact resistance of the samples of this particular product when the fracture occurs as a so-called brittle break, since it has been found that even these samples have a substantial degree of elasticity.

Annealing the polyether product at 71° C. (approximately 25° F. below the heat distortion temperature) for 24 hours appears to make the product harder and more brittle. The tensile and flexural properties increase along with the heat distortion temperature while elongation and impact strength decrease. The unnotched Izod impact resistance was not changed appreciably on annealing.

The electrical properties of a portion of Batch No. 2 of this example were determined on annealed and unannealed samples. The following properties were found. For comparison, the values reported for commercial polycarbonate resin are also given.

|  | This invention | | Polycarbonate, unannealed |
|---|---|---|---|
|  | Unannealed | Annealed 24 hrs. at 71° C. |  |
| Dielectric constant, 10$^3$ cps | 4.07 | 4.00 | 3.02 |
| Power factor, percent, 10$^3$ cps | 0.19 | 0.16 | 0.11 |
| Volume resistivity, ohm-cm.×10$^{15}$ | 4.88 | 3.69 | 2.1 |

EXAMPLE 25

A number of tests were carried out on samples of polyether product prepared according to Example 10. Average values of various properties were determined. It was found that the specimens had an ultimate tensile strength of 8,500–10,000 p.s.i.; a tensile modulus of 300,000 to 600,000; elongation at break of 50–60%; Rockwell hardness of M61–M63; and a heat distortion temperature of 87–93° C.

The Izod impact strength of notched specimen bars was found to cover a range from 2.5 to 32.0 ft.-lb./in. notch; low values corresponded to brittle breaks and high values to ductile breaks. Both compression and injection moldings were tested. Multiple specimens prepared from a single lot of material molded under identical conditions showed both types of fracture.

A portion of polyether product prepared as described, having the properties given above, was retained for about four months and tested for the same and additional properties. The retested sample had an intrinsic viscosity of 0.35 dl./g. and contained 2.1 milliequivalents of base per 100 grams of polyether and 0.008% by weight methyl ethyl ketone. The sample had a yield strength of 10,000 p.s.i., an ultimate tensile strength of 7,200 p.s.i., a tensile modulus of 636,000 p.s.i., an elongation at break of 60–70% (estimated), Rockwell hardness of M61, a heat distortion temperature of 86° C., and an average Izod impact resistance of 10 ft.-lb./inch of notch, Individual specimens had Izod impact resistance values in the range from 2.4 to 32 ft.-lb./inch of notch.

The higher impact resistance values of these specimens are twice as high as the impact resistance of commercial polycarbonate resin.

Compression molded disc specimens of polyether product prepared according to this example were tested for chemical resistance. It was found that when the discs were exposed to various liquids at 100° C. for 24 hours no chemical degradation occurred with water, 5% and 25% aqueous sulfuric acid, 5% and 25% aqueous sodium hydroxide, 5% aqueous acetic acid, 25% aqueous sodium chloride and 5% sodium methoxide in methanol.

EXAMPLE 26

The chemical resistance of a series of specimens prepared in the manner of Example 13 was tested by immersing molded discs, 0.125 inch thick and two inches in diameter, in various solvents and reagents for seven days at 25° C. (ASTM method D 545–56 T). The samples exhibited excellent resistance toward caustic soda, acids and some solvents. No chemical degradation was observed in any of the tests; however, in some instances swelling was found. The data are summarized as follows:

Excellent resistance (no change in thickness or width; weight gain less than 0.4%):
    Sufuric acid (10 and 30% w.)
    Nitric acid (10% w.)
    Sodium hydroxide (3 and 10% w.)
    Sodium chloride (10% w.)
    Hydrogen peroxide (8% w.)
    Ethanol (50% vol.)
    Carbon tetrachloride
    Heptane Fair resistance (weight, width, and thickness gain, each less than 5%):
    Ethanol (95%)
    Phenol (5%)

Poor resistance (5–10% gain in weight):
    Toluene

No resistance (physical structure of disc destroyed):
    Acetone
    Ethylene chloride

EXAMPLE 27

In a test of the adhesive properties of products prepared according to Example 13, a quantity of shreds sufficient to form a thin film is sprinkled between two aluminum plates previously cleaned with chromic acid. The plates are pressed together at 200° C. under 9,000 to 18,500 p.s.i. The tensile shear strength at room temperature of the resulting bonds ranges from 2300 to 2750 p.s.i.

EXAMPLE 28

In further tests of adhesive properties, a cement consisting of a 40 percent solution of the polyether of Example 22 is used to bond a variety of surfaces. In each case, the cement is applied from a tube to a one square inch area on each panel, and the cemented areas are clamped together with 10–12 p.s.i. pressure. The samples are dried at conditions varying from 24 to 72 hours at room temperature or 15 minutes at 200° C. The resultant glue lines are two to three mils thick.

The tensile shear strength, tested at a load application rate of 600–700 p.s.i., per minute, for samples dried at ambient temperatures is shown below.

| Substrate | Drying time (hrs.) | Tensile shear strength, p.s.i. |
|---|---|---|
| Oak-oak | 24 | 325–480 |
| Oak-oak | 72 | 355–520 |
| Redwood-redwood | 72 | 475–725 |
| Rubber-rubber | 72 | 45–60 |
| Ceramic-ceramic | 72 | (1) |
| Leather-leather | 72 | 60–75 |
| Polymethylmethacrylate-polymethylmethacrylate | 72 | 125–175 |
| Redwood-steel | 72 | 400–575 |

[1] Substrate broke before bond.

Applying a 40% solution of the same polyether in dichloromethane results in still stronger bonds in oak-oak substrates. Similarly strong bonds are produced in oak with a solvent free polymer.

Results of bonding metal-metal substrates demonstrate the need for an elevated baking temperature for best results. With 15 minutes baking time at 200° C., bond strengths are Steel-steel _____ 1350–1465
Aluminum-aluminum _____ 2000–2600

Equally strong bonds are obtained by using in lieu of resin cement a solvent-free pre-formed sheet of the same resin.

A polyether is prepared from a standard technical grade of bisphenol A (a commercial product which contains about 96.5% of p,p'-bisphenol A) and from an epoxyether which is a commercial reaction product of the same grade of bisphenol A with epichlorohydrin, which reaction product has a Durrans' mercury melting point of about 70° C., a number average molecular weight of about 900 and an epoxy equivalence of about 0.20 equivalent per 100 grams. The content of phenolic hydroxyl groups of the bisphenol and of epoxy groups of the epoxy ether are determined by standard tests. The reaction mixture is made up to contain 1.01 equivalent of epoxide functionality to 1.00 equivalent of phenolic hydroxyl group. The catalyst is 0.15% by weight of sodium hydroxide based on the total reactants charged. It is added in the form of 45% aqueous sodium hydroxide. The reaction mixture of bisphenol and epoxy ether is dissolved in methyl ethyl ketone to make a 40% by weight reactant solution. The reaction is carried out at 130° C. for a time of about 6 hours. The end of the reaction period is determined by measuring the intrinsic viscosity of the mixture and comparing it with a previously prepared calibration scale obtained with identical reactants at similar conditions. When the desired intrinsic viscosity has been obtained the reaction mixture is neutralized by adding gaseous carbon dioxide. Additional methyl ethyl ketone is then added to reduce the resin concentration to 20% by weight. This solution is washed with water which is saturated with MEK, to remove the neutralized catalyst. The desired solid product is recovered from the neutralized wash solution by pouring one volume of the solution with vigorous agitation into ten volumes of ice water. The resulting shreds are washed with water and dried for 16 hours at 100° C. in a blower oven.

The product is molded into discs at 160° C. and 1000 p.s.i. After aging overnight the discs withstand 160 inch pounds of impact in the Gardner variable impact tester without breaking or cracking.

EXAMPLE 30

Washed reaction mixture from Example 29 is sent to a flashing operation wherein MEK is added to give a water-to-MEK ratio of 0.11 or less, and the water-MEK azeotrope is removed by distillation until dry solution of polymer in MEK remains as bottoms. This solution of polyether in MEK is useful for preparing surface coatings.

EXAMPLE 31

Portions of the polyether prepared according to Example 29 were compression molded and subjected to analysis and performance tests. The following table lists the results of these tests.

Analytical properties:
  Intrinsic viscosity, dl./g. ---------------- 0.42
  Molecular weight (weight average) ------ 227,000
  Epoxide content, eq./100 g. -------------- 0.002
  Phenolic hydroxyl, eq./100 g. ----------- <0.002
  α-glycol, eq./100 g. --------------------- 0.018
  Secondary hydroxyl, eq./100 g. --------- 0.350
  Cyclic 2:2 components, percent w. ------- 1.0
  Alkalinity, meq./100 g. ----------------- 0.1

Performance properties of compression moldings:

Heat distortion, temp., ° C. ------------ 87
  Vicat softening point, ° C. ------------- 100
  Impact strength, Izod (⅛ in. bar):
    Notched, ft.-lb./in. ----------------- 0.8
    Unnotched, ft.-lb./in. width --------- 43
  Tensile data:
    Yield strength, p.s.i. --------------- 9800
    Ultimate yield, p.s.i. --------------- 6300
    Elongation, percent ------------------ 4-17
  Flexural strength, p.s.i. --------------- 15,400
  Rockwell hardness (M) ------------------- 66

In general the above mechanical and performance properties are not significantly different from the properties of a polyether prepared with the use of a commercial concentrate of the diglycidyl ether of bisphenol A such as was employed in Example 22, except that the notched impact strength is lower. Accordingly, the polyethers prepared according to this method is particularly desirable for use in the preparation of surface coatings or adhesives. The analytical properties of the polyether prepared in this manner differ from those of the polyether prepared with said diglycidyl ether concentrate in that the number average molecular weight is somewhat lower, the content of cyclic 2:2 component is substantially lower (1.0 vs. 2.4) and the α-glycol content is somewhat higher (0.018 vs. 0.005). The increased α-glycol content is attributed to the α-glycol groups present in the epoxide used as a starting material. No glycols appear to be formed during the condensation reaction with bisphenol A. No significant difference in performance has been found attributable to this very small increase in α-glycol content nor to the somewhat reduced molecular weight.

A significant improvement in polyether products produced according to Examples 29 et seq. as compared to those produced with the diglycidyl ether concentrate is the reduction in content of low molecular weight, cyclic, high melting, poorly soluble component. This component, in the concentrations in which it is present in products produced according to the earlier examples, does not affect the performance of moldings or other shaped products. However, in the case of polyether products which are maintained in solution, it has the undesirable property of crystallizing at the storage conditions and causing solutions to become cloudy. It can be re-dissolved by heat but it reprecipitates on cooling. It does not undesirably affect the performance of coatings when it is dissolved, but solutions containing it in excess of its solubility become cloudy and are not suitable for the preparation of smooth, continuous coatings. Solutions of the polyether products of Examples 29 et seq. and according to Example 14 do not experience such crystallization. These products are, therefore, particularly suitable for use in solution applications, i.e., in the formation of surface coatings and the like.

EXAMPLE 32

In the preparation of a polyether solution from the neutralized reaction mixture of Example 29, the total reaction product is "polish filtered" by filtering the solution at 70° C. through a diatomaceous earth such as Celite 545. Primarily this serves to remove undissolved neutralized catalyst; in addition other insoluble matter such as inorganic salts, dust particles, trash, etc. are removed. The resulting product is a solution of sparkling clarity. The neutralized catalyst which is removed in this fashion is present in the reactor product at a concentration of about 3.0 meq./100 g. resin. The filtration reduces this concentration to 0.5 meq./100 g. resin, a level which does not appear to be detrimental to product performance of a coatings solution.

EXAMPLE 33

A polyether product consisting essentially of polymers having the repeating unit

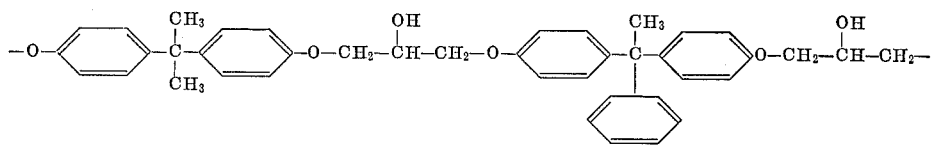

was prepared from bis(4-hydroxyphenyl)methylphenylmethane and the diglycidyl ether of bisphenol A by a procedure similar to that described in Example 29 for the production of reaction product of bisphenol A with epoxyether derived from bisphenol A.

Three separately prepared batches were combined in solution and the solid resin recovered by dumping the combined solution into a large excess of chilled water in a shredder. The shreds were then thoroughly dried.

Analytical properties and performance tests of the recovered resin are shown in the following table. The product also has good impact resistance when tested on the Gardner variable impact tester.

has a heat distortion temperature of 104° C. and good impact resistance.

EXAMPLE 37

Examples 2 and 13 are repeated, in appropriate reaction solvents, with a variety of bisphenols substituted for bisphenol A. Polymers are produced consisting essentially of molecules having the repeating unit

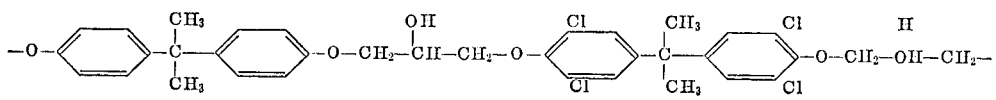

| Property | Value |
|---|---|
| Intrinsic viscosity (dl./g.) | 0.37 |
| Molecular weight (MW) | 70,800 |
| Epoxide, eq./100 g. | 0.002 |
| Phenolic hydroxyl, eq./100 g. | 0.008 |
| Dioxane, percent w. | 0.02 |
| MEK, percent w. | 0.02 |
| $H_2O$, percent w. | <0.05 |

| Performance properties | Compression molded | Injection molded |
|---|---|---|
| Heat distortion temperature, ° C. (264 p.s.i.) ⅛-inch bar | 108 | 100 |
| Heat distortion temperature, ° C. (66 p.s.i.) ⅛-inch bar | 112 | 11[1] |
| Vicat softening point, ° C. | 119 | 120 |
| Impact strength notched Izod (ft.-lb-/in. notch), ⅛-inch bar | 1.4 | [1]1.8/1.6 |
| Impact strength, unnotched Izod (ft.-lb./in. width), ⅛-inch bar | 48 | [1]65/56 |
| Hardness, Rockwell | M 75 | M 68 |

[1] Gate/dead.

EXAMPLE 34

Polyether products of the kind illustrated in Example 33 are produced by repeating Examples 2 and 13, substituting for the bisphenol A bis(4-hydroxyphenyl)methylphenylmethane and using as solvent a mixture of MEK and dioxane. The resulting polyethers have equally good impact resistance, tested on the Gardner variable impact tester, and have a higher heat distortion temperature than the products of Examples 2 and 13.

Similar polyether product is produced from bisphenol A and bis(2,3 - epoxypropoxyphenyl)methylphenylmethane.

EXAMPLE 35

Examples 2 and 13 are repeated, substituting for the bisphenol A bis(4-hydroxyphenyl)methylphenylmethane, for the diglycidyl ether bis(2,3-epoxypropoxyphenyl) methylphenylmethane and using as solvent a mixture of MEK and dioxane. Polyether products are products which consist essentially of molecules having the repeating unit.

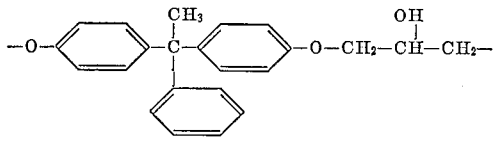

and which have good impact resistance.

EXAMPLE 36

Example 13 is repeated, substituting for the bisphenol A an equal molecular proportion of 2,2-bis(3,5-dichloro-4-hydroxyphenyl)propane. The resulting linear polymer, consisting essentially of molecules having the repeating unit.

wherein $R^1$ and $R^2$ are $-CH_3$ and $R^3$ and $R^4$ are as indicated. Resins of good impact resistance are produced, for example, with bis(4-hydroxyphenyl)methane-

[$R^3 = R^4 = H$]

1,1 - bis - (4-hydroxyphenyl)ethane [$R^3 = H$; $R^4 = CH_3$];
2,2 - bis(4-hydroxyphenyl)butane [$R^3 = CH_3$; $R^4 = C_2H_5$], bis(4 - hydroxyphenyl)diphenylmethane

[$R^3 = R^4 = C_6H_5$]

Similarly, resins of good impact resistance are produced by the reaction of the above and of p,p'-bisphenol A with diglycidyl ethers of the respective phenols and with diepoxybutane, diglycidyl ether and diglycidyl ether of ethylene glycol.

The following illustrates the mechanism of the reaction for producing the polyether products of this invention according to U.S. Pat. 3,306,872 and may assist in a more complete understanding of the present invention. For simplicity of description the following symbols are used:

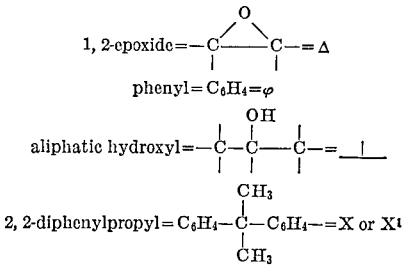

As an illustrative example, consider the reaction of p,p'-bisphenol A with the diglycidyl ether of p,p'-bisphenol A, catalyzed by NaOH.

The reaction chain proceeds as follows:
(1) A hydroxyl ion reacts with a phenolic hydroxyl:

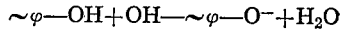

(2) The resulting ion reacts with an epoxide

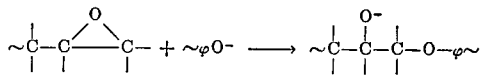

(3) The olkoxide intermediate reacts with another phenolic hydroxyl to yield a neutral resin intermediate and a phenolate ion.

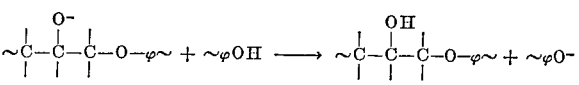

The regenerated $\sim\varphi O^-$ can then continue the chain by reacting with another phenolic hydroxyl.

The overall reaction proceeds to build long linear molecules which can terminate in two epoxy groups, two phenolic hydroxyl groups, or one group of each type. Schematically the possible reactions which result in the formation of each of these types are represented by:

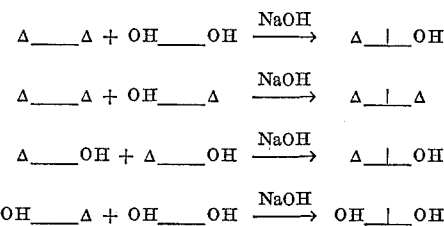

The formation of high molecular weight linear polymers by this type of reaction does not depend on progressive addition of one monomer molecule at a time to a polymer molecule. Instead, polymer molecules are generally built to higher molecular weight mainly by condensation with other molecules.

In the reaction between dihydric phenol and diglycidyl ether, the growth of polymer chains is accompanied by a corresponding increase in the number of aliphatic hydroxyl groups. The linear polymer has the structure:

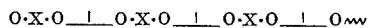

At the same time, the number of phenolic hydroxyl groups decreases as the reaction proceeds. It therefore becomes more likely for an NaOH molecule to react with an aliphatic hydroxyl group. It is then possible for an epoxide-terminated polymer molecule to react with the aliphatic

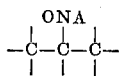

resulting in a polymer molecule having a long branch chain, e.g.

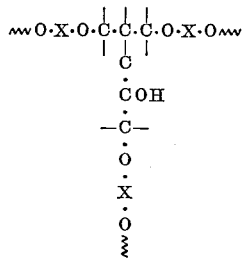

The presence of a significant number of such branched molecules destroys the high impact properties of the resulting product.

Since phenolic OH groups are more acidic than aliphatic ones, NaOH is more likely to react with a phenolic —OH group as long as a substantial number of such groups is present. The probability of NaOH reacting with an aliphatic —OH will be increased by an increase in the concentration of NaOH in the mixture or by an increase of the ratio of aliphatic to phenolic OH groups. The production of excessive proportions of branched molecules is therefore avoided by using only a very small amount of basic catalyst, at least during the later states of the reaction.

Another seriously objectionable effect is that due to substantial amounts of water. Water can react with a terminal epoxy group to form an alpha glycol. This group has only a minimal reactivity and thus acts both to reduce the reaction rate and to hold down the molecular weight of the polymer by effectively inhibiting further growth of each affected polymer molecule. Water is, thus, a chain stopper. Water concentrations at least up to 0.12 percent do not result in substantial alpha glycol formation. It has been found, however, that when the amount of water exceeds about one percent of the mixture, the reaction does not proceed to produce high impact linear polymer.

Other compounds whose presence is to be avoided because they act to terminate chains are monohydric phenols and monoepoxides.

In the generic formula illustrated above, the phenylene ring

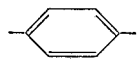

schematically represents an unsubstituted ring —$C_6$—$H_4$— and a ring having from one to four of the hydrogens replaced by alkyl groups or halogen atoms. The formula may, therefore, also be written

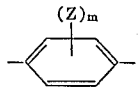

wherein Z is an alkyl or halogen group and $m$ is an integer from 0 to 4, inclusive.

We claim as our invention:

1. A thermoplastic polyether consisting essentially of linear molecules having the repeating unit

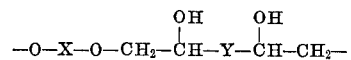

in which Y represents (a) the divalent group, between vicinal epoxy groups, of a diepoxide selected from the group consisting of terminal diepoxyalkanes of from 4 to 8 carbon atoms per molecule, terminal diepoxides of saturated aliphatic ethers containing from 6 to 10 carbon atoms; or (b) the group

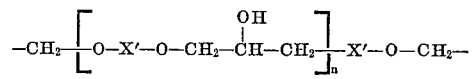

wherein the average value of $n$ is in the range from 0 to about 6; X and X' represent the diphenylene alkylene group

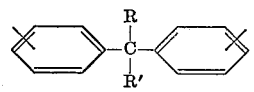

and R and R' are from the group consisting of hydrogen, alkyl, cyclohexyl, phenyl, alkyl-substituted cyclohexyl, alkyl-substituted phenyl, halogen-substituted cyclohexyl and halogen-substituted phenyl groups with the total number of carbon atoms in the group or groups attached to the central carbon atom C not exceeding eighteen, said product having an intrinsic viscosity of at least 0.3 dl./g., measured in 1,2-dimethoxyethane, a weight average molecular weight of at least about 25,000, and ability to resist 160 inch-pounds of impact without breaking or cracking when tested in the form of a 5/32 inch x 1¼ inch disc in the Gardner variable impact tester.

2. A thermoplastic polyether consisting essentially of linear molecules having the repeating unit

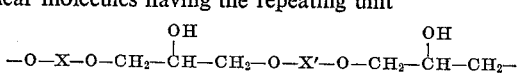

in which X and X' each has the structure

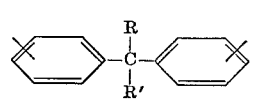

in which R and R' are from the group consisting of hydrogen, alkyl and phenyl; the total number of carbon atoms attached to the central carbon atom C does not exceed eighteen, and the benzene rings are unsubstituted or halogen-substituted, said polyether having an intrinsic viscosity of at least about 0.30 dl./g., measured in 1,2-dimethoxyethane, an epoxy group content not exceeding 0.01 equivalents per 100 grams a weight average molecular weight of at least about 25,000, and ability to resist 160 inch-pounds of impact without breaking or cracking when tested in the form of a compression molded 5/32 inch x 1¼ inch disc in the Gardner variable impact tester.

3. A thermoplastic polyether according to claim 7 having an intrinsic viscosity in the range from 0.3 to 0.55 and a tensile impact strength greater than 100 p.s.i.

4. A thermoplastic polyether according to claim 1 in which Y has the structure

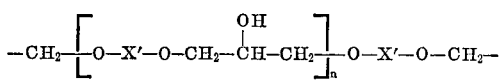

$n$ is a value in the range from 0 to 6, X has the structure

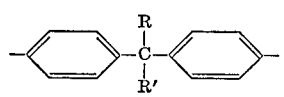

and X' has the structure

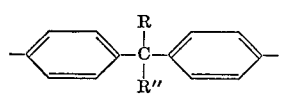

wherein R is a methyl group and at least one of groups R' and R'' is a phenyl group, the other being a methyl or a phenyl group.

5. A thermoplastic polyether according to claim 1 in which Y has the structure

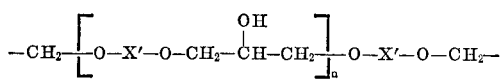

$n$ is a value in the range from 0 to 6, X has the structure

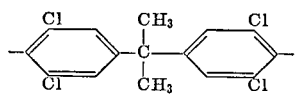

and X' has the structure

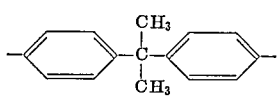

6. A thermoplastic polyether according to claim 1 in which Y has the structure

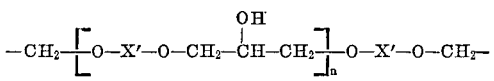

$n$ is a value in the range from 0 to 6, X has the structure

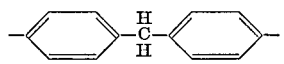

and X' has the structure

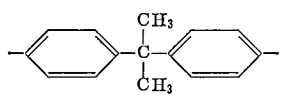

7. A thermoplastic polyether consisting essentially of linear molecules having the repeating unit

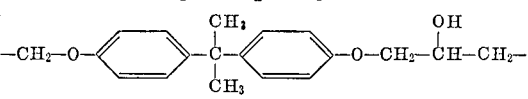

and having an intrinsic viscosity of at least about 0.3 dl./g., measured in 1,2-dimethoxyethane, an epoxy group content not exceeding 0.01 equivalents per 100 grams, a weight average molecular weight of at least about 25,000, and ability to resist 160 inch-pounds of impact without breaking or cracking when tested in the form of a compression molded 5/32 inch x 1¼ inch disc in the Gardner variable impact tester.

8. A thermoplastic polyether according to claim 7 in which said epoxy group content is in the range from 0.002 to 0.008 epoxy equivalents per 100 grams.

References Cited

UNITED STATES PATENTS 2,602,075  7/1952  Carpenter et al. _____ 260—47 EP

WILLIAM H. SHORT, Primary Examiner

T. E. PERTILLA, Assistant Examiner

U.S. Cl. X.R.

117—128.4, 138.8 F, 139, 142, 148, 161 ZB; 161—184; 260—47 EQ